April 7, 1964 S. PURE 3,128,393
BISTABLE TRANSISTOR MULTIVIBRATOR USED AS A GATING CIRCUIT
Filed Feb. 29, 1960
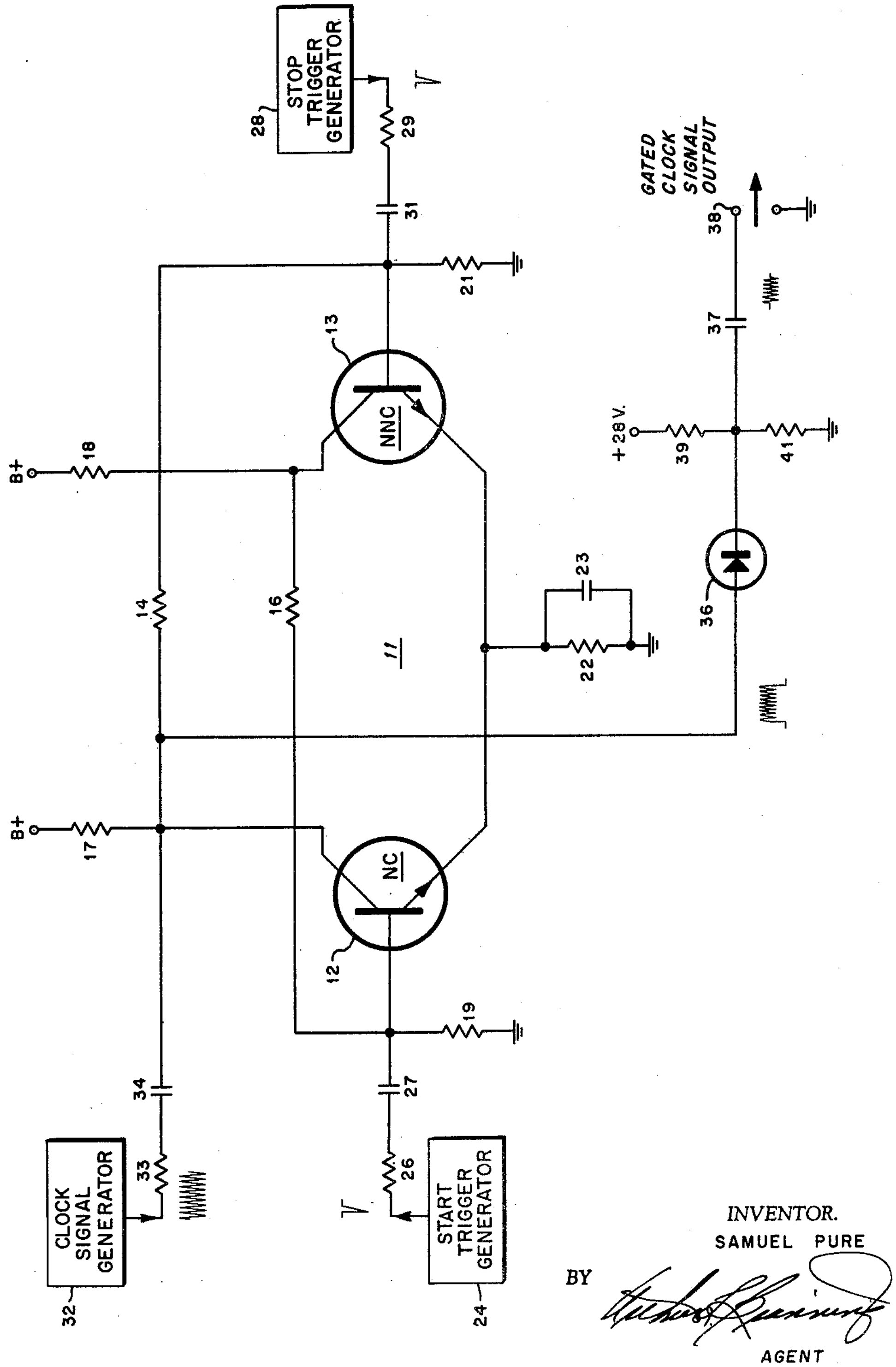
INVENTOR.
SAMUEL PURE
BY [signature]
AGENT United States Patent Office 3,128,393

Patented Apr. 7, 1964

3,128,393
BISTABLE TRANSISTOR MULTIVIBRATOR USED AS A GATING CIRCUIT

Samuel Pure, Rydal, Pa., assignor to the United States of America as represented by the Secretary of the Navy Filed Feb. 29, 1960, Ser. No. 11,937
4 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a transistorized gating circuit wherein the conductive states of a bistable multivibrator determine the gating interval during which clock pulses are passed by the multivibrator acting as an electronic gate.

The presnt invention relates to an electronic circuit operable to successively assume aech of two stable conductive states in response to the successive occurrence of two events and operable during the time interval between the occurrence of the events to transmit a signal, and more particularly to a circuit of the character described embodying semi-conductors.

The present invention, while not limited thereto, has particular application in interval timing systems. In this application the signal transmitted may comprise a timing signal such as a clock signal which may, for example, be supplied from an oscillator. The circuit may be caused to assume each of the two stable conductive states by the application thereto of triggering pulses from trigger generators operable in response to the occurrence of the two events.

Known prior art electronic interval timing systems usually employ a gate generator operable to generate a gating pulse persisting during the time interval to be measured in combination with an electronic gating circuit controlled by the gating pulse and coupled to a standard frequency signal source. In contrast to the present invention, such circuits are unduly complex, expensive, bulky, and, to the extent of the added complexity, less reliable.

It is, therefore, an object of the present invention to provide an electronic circuit operable to successively assume each of two stable conductive states upon the successive occurrence of two events and operable during the time interval between the occurrence of the events to transmit a signal.

It is another and more specific object of the present invention to provide an electronic circuit of the character described embodying semi-conductors.

It is still another object of the present invention to provide a simple and reliable circuit of the character described operable to perform a gating function and particularly adapted for use in time interval measuring systems.

Other objects and any of the attendant advantages of this invention will be readily appreciated as the same becomes better understood by reference to the following detail description when considered in connection with the accompanying drawing wherein:

The figure is a circuit diagram of an embodiment of the invention.

Referring now to the figure there is shown an electronic circuit, generally indicated by the reference numeral 11, having two stable conductive states. Circuit 11 includes a pair of semi-conductor devices 12, 13, which may comprise transistors of the NPN type.

For convenience the terms emitter, collector, and base, conventionally employed to designate the operative parts of a transistor, will be used below. It is to be understood, however, that the terms as employed herein are intended to be illustrative and not restrictive.

The collector-base circuits of semi-conductor devices 12, 13 are interconnected by resistances 14, 16 while the collectors thereof are further coupled respectively to a source of positive potential through resistors 17, 18. The base circuits of semi-conductor devices 12, 13 are further respectively connected to a point of reference potential, for example ground, through resistors 19, 21 while the emitters thereof are coupled in common to the point of reference potential through a network comprising a resistor 22 and a capacitor 23 connected in parallel therewith.

The network comprising resistor 22 and capacitor 23 functions to provide bias and high frequency by-pass circuitry for semi-conductor devices 12, 13 while the circuits including resistors 14, 16 function to provide regenerative feedback to facilitate the transition of the circuit from one stable conductive state to the other and, in cooperation with the circuits including resistors 19, 21 further function to enhance the stability of the circuit.

The functions briefly mentioned in the next preceding paragraph are derived from principles familiar to those skilled in the art of semi-conductor multivibrator circuits and the like and will not therefore be further discussed.

The output terminal of a start trigger generator is coupled through a resistor 26 and a capacitor 27 to the base of semi-conductor device 12 and to the ungrounded terminal of resistor 19 while the output terminal of another start trigger generator 28 is similarly coupled through a resistor 29 and a capacitor 31 to the base of semi-conductor device 13 and to the ungrounded terminal of resistor 21.

The collector of semi-conductor device 12 is coupled to signal input generator 32 through a resistor 33 and a capacitor 34 and is further coupled through a diode 36 and a capacitor 37 to output terminals 38.

A biasing network comprising resistors 39, 41 is provided and coupled between a source of positive potential and the point of reference potential. The common terminal of resistors 39, 41 is connected intermediate diode 36 and capacitor 37.

Having thus described an embodiment of the invention, the mode of operation thereof will now be set forth. For illustrative purposes it will be assumed that the invention is employed in an interval timing system wherein it is desired to determine the time interval between the occurrence of two events. When the invention is so employed, trigger generators 24, 28 may be actuated by some outside condition and will respectively operate to provide negative triggers upon the occurrence of each of the two events. Generator 32 may be a timing signal source, such as an oscillator, while terminals 38 may be coupled to a cycle or pulse counter (not shown).

Assuming that semi-conductor device 12 is initially conducting, it may be seen that the circuit including the semi-conductor device 12 provides a low impedance shunt to the output circuit including diode 36, resistor 41, and capacitor 37. As mentioned above, the output circuit may further comprise a cycle or pulse counter. Thus, in this circuit condition, no signals appear at output terminals 38. Upon application of a negative trigger from generator 24 to the base of semi-conductor device 12, the device is rendered nonconductive, coupling a positive pulse from the collector thereof through resistor 14 to the base of semi-conductor device 13 rendering semi-conductor device 13 conductive. In this circuit condition signals are transmitted from generator 32 to output terminals 38. In a manner similar to that described above, upon receipt of a negative trigger from generator 28, semi-conductor device 13 is rendered nonconductive and semiconductor device 12 is again rendered conductive isolating generator 32 from output terminals 38.

During the interval between the occurrence of negative triggers, applied respectively by generators 24, 28, the signals from the timing signal source, generator 32, would appear at output terminals 38 as modulation on a positive square wave were it not for the operation of the biasing network comprising resistors 39, 41. This waveform may not be optimum for some applications. The biasing network functions to eliminate the square wave permitting only clock signals to appear at output terminals 38.

The cycle or pulse counter, referred to above as coupled to output terminals 38, functions in a conventional manner to provide, for example, a time indication referenced to a selected time base. It is to be understood, however, that other time measuring or time responsive apparatus may instead be coupled to the output terminals.

While a specific application of the invention has been described, it will be recognized that the invention may be employed in any circuit requiring a gating function, for example.

Obviously, many modifications are present in the light of the above teachings. It is therefore to be understood that within the scope of the appended claims, the invention may be practiced otherwise than as specifically described.

What is claimed is:

1. A transistorized gating circuit comprising: a multivibrator circuit including first and second transistors of the NPN type, first circuit means interconnecting elements of said transistors to form a conductively bistable circuit, said first circuit means comprising a first resistor connected between the collector of said first transistor and the base of said second transistor, a second resistor connected between the collector of said second transistor and the base of said first transistor, a third resistor connecting the base of said first transistor to a reference potential, a fourth resistor connecting the base of said second transistor to said reference potential, conductor means coupling the emitters of said transistors in common to said reference potential, and second circuit means coupling the collectors of said transistors to a source of positive potential; a signal input terminal; a signal output circuit comprising a resistive network having an intermediate terminal and coupled between a bias potential and said reference potential, a signal output terminal coupled to said intermediate terminal, and a diode having the cathode thereof coupled to said intermediate terminal; circuit means coupling said signal input terminal and the anode of said diode in common to the collector of one of said transistors; and control means coupled to said transistors operative to selectively cause said multivibrator circuit to assume one of the two stable conductive states, first and second trigger pulse sources, said control means comprising first and second control signal terminals respectively coupled to said first and second trigger pulse sources and respectively coupled to the bases of said first and second transistors.

2. A transistorized gating circuit, comprising in combination: a first transistor, a second transistor, first resistor means connecting the base of said first transistor to the collector of said second transistor, second resistor means connecting the base of said second transistor to the collector of said first transistor, low impedance means connecting the emitters of said first and second transistors in common to ground, direct current source means connected to the collectors of said first and second transistors, input terminal means connected to the collector of said first transistor, output terminal means connected to said collector of said first transistor, control means connected to the bases of said first and second transistors for reversing the conductive states of said first and second transistors whereby for one conductive state said first transistor effectively connects an infinite impedance between said input terminal means and the emitter of said first transistor.

3. A transistorized gating circuit, comprising in combination: a first transistor having a collector, emitter, and base, a second transistor having a collector, emitter, and base, low impedance means electrically connecting said emitters to ground direct current source means, second conductor means connecting said collectors to said direct current source means, first feedback means connecting said collector of said second transistor to said base of said first transistor, second feedback means connecting said collector of said first transistor to said base of said second transistor, output terminal means, diode means connected between the collector of said first transistor and said output terminal means, a source of clock pulses, third conductor means connecting said collector of said first transistor to said source of clock pulses, control means for changing the conductive states of said first and second transistors whereby said transistorized gating circuit shunts said clock pulses to ground through said low impedance means when said gating circuit is in a first conductive state and passes said clock pulses to said output terminal means when said gating circuit is in a second conductive state.

4. A transistorized gating circuit comprising in combination: a first transistor having a collector, emitter, and base, a second transistor having a collector, emitter, and base, low impedance means electrically connecting said emitters to ground, direct current source means, second conductor means electrically connecting said collectors to said direct current source means, first resistor means connecting said collector of said second transistor to said base of said first transistor, second resistor means connecting said collector of said first transistor to said base of said second transistor, output terminal means, diode means connected between said collector of said first transistor and said output terminal means, a source of clock pulses, third conductor means connecting said collector of said first transistor to said source of clock pulses, first control means connected to said first transistor to cause said first transistor to become conducting whereby said clock pulses are shunted to ground through said low impedance means, second control means connected to said second transistor to cause said first transistor to become non-conducting whereby said clock pulses are passed to said output terminal means.

References Cited in the file of this patent

UNITED STATES PATENTS

| | | |
|---|---|---|
| 2,597,796 | Hindall | May 20, 1952 |
| 2,645,713 | Pritchard | July 14, 1953 |
| 2,757,286 | Wanlass | July 31, 1956 |
| 2,816,237 | Hageman | Dec. 10, 1957 |
| 2,867,734 | Steed | Jan. 6, 1959 |
| 2,903,605 | Barney | Sept. 8, 1959 |
| 2,929,940 | Jones | Mar. 22, 1960 |
| 2,964,655 | Mann | Dec. 13, 1960 |